March 2, 1943. J. HAMILL 2,312,407
VACUUM PAN
Original Filed May 17, 1939 2 Sheets-Sheet 2
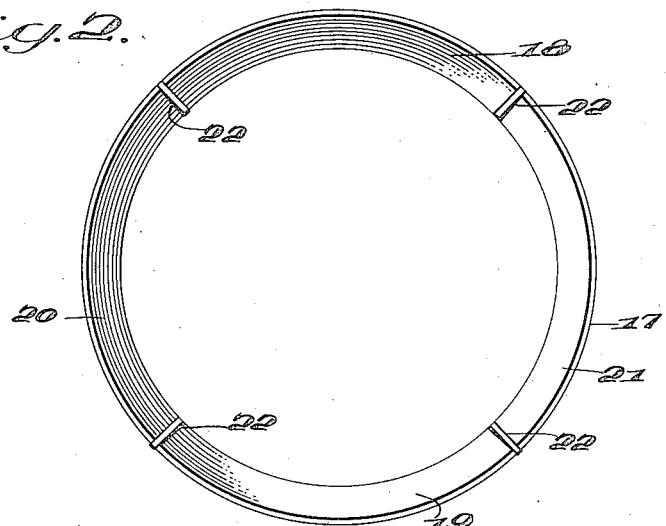
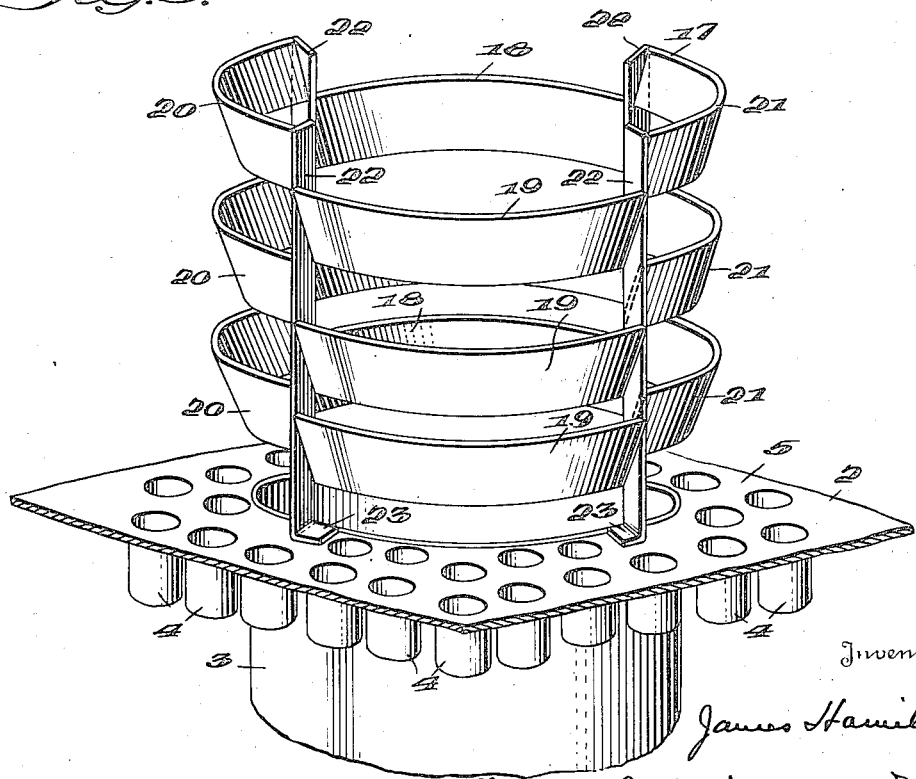

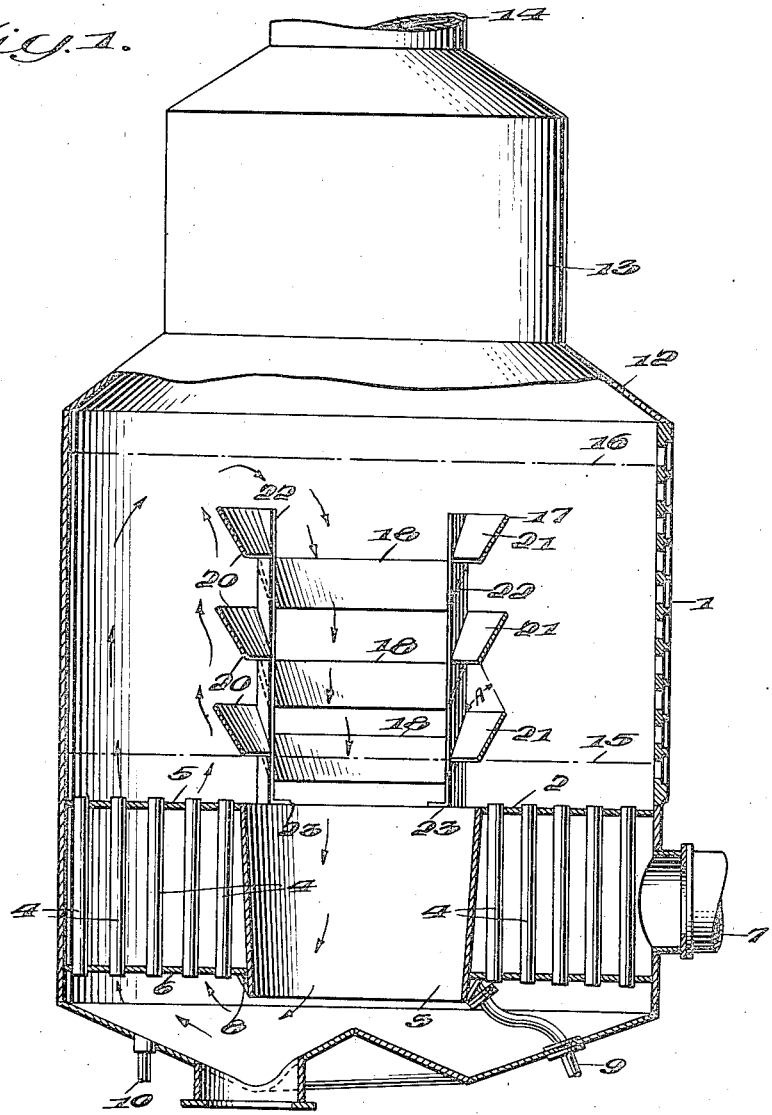

Patented Mar. 2, 1943

2,312,407

UNITED STATES PATENT OFFICE 2,312,407

VACUUM PAN

James Hamill, West Orange, N. J.

Original application May 17, 1939, Serial No. 274,253. Divided and this application June 18, 1941, Serial No. 398,657

5 Claims. (Cl. 159—27)

My invention relates to vacuum pans and particularly to pans of the type which are commonly used in the concentration of sugar syrups and are provided with a central downtake through which the circulating mass being concentrated descends to the space below the calandria and ascends through a plurality of of vertical tubes to the space above the calandria. The present application is a division of my application which is now Patent No. 2,258,704, dated October 14, 1941.

The principal object of the invention is to provide improved means for promoting the separation of the ascending and descending currents in the circulating mass above the calandria by inducing the ascending stream containing the vapors to rise to the surface of the mass in the pan without interfering with the descending stream which has been freed of its steam so that a greater temperature differential will exist between the ascending and descending streams and the circulation of the mass thereby accelerated.

A primary feature of the invention consists in providing a vacuum pan having a calandria with a tubular device which is disposed above the downtake of the calandria and which is provided with a plurality of sets of vertically spaced curved louvres each of which has an upwardly and outwardly inclined outer surface for deflecting the circulating mass ascending adjacent the tubular member away from the circulating mass descending therein.

Another feature of the invention consists in providing the tubular member with a plurality of sets of vertically spaced curved louvres, the louvres of one set being in staggered relation with respect to the louvres of another set and each of the louvres being inclined upwardly and outwardly.

Other and more specific features of the invention, residing in advantageous forms, combinations and relations of parts, will hereinafter appear and be pointed out in the claims.

In the drawings,

Figure 1 illustrates a vacuum pan embodying my invention.

Figure 2 is a plan view of the tubular-like member.

Figure 3 is a perspective view of the tubular-like member and adjacent portions of the calandria.

Referring more particularly to the drawings, 1 indicates the body of a vacuum pan of standard construction and 2 a calandria having a central downtake 3 surrounded by a plurality of vertical tubes 4 which are supported in upper and lower tube sheets 5 and 6, respectively. Steam is admitted to the calandria through an inlet 7 and condensate from the steam collects in a drain gutter 8 from which it may be conducted by one or more pipes 9.

As is customary, the bottom of the pan is provided with an inlet pipe 10 through which sugar syrup to be concentrated is admitted and it is also provided with an outlet 11 through which the concentrated mass is discharged from the pan. The upper portion of the pan tapers inwardly to provide a dome 12 above which is located in the portion of the pan designated 13 a vapor separator (not shown). Leading from the vapor separator is the usual vapor outlet 14.

In the normal operation of vacuum pans of this type the initial charge of syrup admitted to the pan is of sufficient volume to cover the upper tube sheet 5, the level usually attained by the initial charge being approximately indicated by the dot and dash line 15. With the steam in the calandria 2 and a vacuum existing in the interior of the pan by virtue of the condensation of the vapors removed through the outlet 14, the normal circulation of the boiling mass in the pan is upwards in the tubes 4 and downwards in the downtake 3. As concentration of the mass proceeds, additional syrup is drawn into the vacuum pan at properly timed intervals through the inlet pipe 10, of which there may be a plurality, to promote the formation of crystals in the usual manner until the contents of the pan reach the strike level indicated approximately by the dot and dash line 16.

In the standard construction of vacuum pans where no attempt is made to separate the ascending and descending currents in the circulating mass above the calandria, the ascending mass containing vapor bubbles converges toward the center of the pan and instead of rising to the surface of the mass where the entrained bubbles would be liberated, much of it takes the shortest path of return to the under side of the calandria by passing down the intake before rising to the surface. This interferes with and retards the descent of circulating currents returning from the surface. To eliminate this undesirable result, a tubular device 17 is provided above the downtake of the calandria. This device defines a passageway for the descending circulating mass and it is so formed as to cause substantially all of the ascending circulating currents to rise to the surface of the mass where the entrained vapor bubbles are liberated. By compelling the ascending mass to rise to the surface before returning to the calandria, a greater temperature differential than is otherwise possible will exist between the ascending and descending currents and the circulation of the mass will, therefore, be accelerated. More rapid circulation also results from the circumstance that the difference in density between the ascending and descending currents is increased by reason of the descending currents having been substantially freed of all vapor bubbles.

The tubular device 17 for separating the ascending and descending currents of the circulating mass consists of a plurality of sets of curved vertically spaced louvres or vanes, the sets of louvres being respectively designated by the reference numerals 18, 19, 20 and 21, respectively. Interposed between the adjoining ends of the louvres of adjacent sets are vertically extending radially arranged plate-like members 22 by which the louvres are supported. The ends of the louvres abut against the supporting members and may be conveniently welded thereto, while the lower end of each of the supporting members may be advantageously flanged as indicated at 23 for attachment, as by welding, to the upper tube sheet 5 of the calandria.

The louvres of each set are so arranged that the lower edge of each louvre, with the exception of the lowermost one, is spaced vertically above the upper edge of the subjacent louvre so that these lower and upper edges of the louvres respectively define the upper and lower edges of openings through which the circulating mass in the pan may overflow into the passageway defined by the louvres. The lowermost louvre of each set is suitably spaced from the upper tube sheet 5 so that ample opportunity is afforded for the circulation of the initial charge of syrup.

The outer surfaces of the louvres are inclined upwardly and outwardly so as to deflect the circulating mass ascending from the tubes 4 away from the column of circulating mass descending within the passageway which the louvres define. The inclination of the louvres is such, considering the vertical distance between the louvres, that the vapor bubbles in the ascending stream will be diverted outwardly sufficiently to be intercepted by the next louvre above should the bubbles expand inwardly towards the descending mass. It has been found that best results are obtained if the louvres are preferably vertically spaced so that the angle designated A between the horizontal and a line connecting the lower edge of one louvre with the upper edge of the subjacent louvre is no greater than approximately 50°. This angle may, of course, be less than the amount indicated but to be certain that all entrained vapor bubbles will be caused to ascend to the surface of the circulating mass, it should not exceed 50% by any substantial amount.

The louvres of at least one set are arranged in staggered relation with respect to the louvres of one or more of the other sets so that the tubular device is provided with one or more peripheral openings at substantially every level which may be assumed by the mass within the pan. While the louvres 18 and 19 are shown in the drawings as being disposed at the same elevations and in staggered relation with respect to louvres 20 and 21, it will, of course, be appreciated that the louvres may be disposed in other staggered relationships and that a greater or fewer number of sets of louvres may be employed.

From the foregoing, it will be perceived that simple and effective means have been devised for guiding the circulation of the mass so as to compel the ascending circulating mass containing vapor bubbles to rise to the surface and thus prevent it from interfering with the descending mass which has been freed of its vapor. Various modifications and changes in the specific structure illustrated and described may, of course, be made without departing from the spirit of the invention as defined in the appended claims.

What I claim is:

1. The improvement in vacuum pans of the type having a calandria provided with a downtake and a plurality of tubes, said improvement consisting of a tubular-like member positioned above the downtake in substantially vertical alinement therewith for promoting the circulation of the mass being concentrated in the pan, said tubular-like member providing a vertically extending passageway for the circulating mass descending toward the downtake and comprising a plurality of sets of vertically spaced arcuate louvres, each of said louvres having an outer surface inclined upwardly and outwardly for deflecting the circulating mass ascending adjacent the tubular member away from the column of circulating mass descending in said passageway and said tubular member having a plurality of overflow openings the upper and lower edges of which are respectively defined by the lower and upper edges of the louvres of each set, the openings formed by the louvres of one of said sets being arranged in staggered relation with respect to the openings formed by the louvres of another of said sets.

2. The improvement in vacuum pans of the type having a calandria provided with a downtake and a plurality of tubes, said improvement consisting of a tubular-like member positioned above the downtake in substantially vertical alinement therewith for promoting the circulation of the mass being concentrated in the pan, said tubular-like member providing a vertically extending passageway for the circulating mass descending toward the downtake and comprising a plurality of sets of vertically spaced arcuate louvres, the louvres of one set being arranged in staggered relation with respect to the louvres of another set and each of said louvres being inclined upwardly and outwardly for deflecting the circulating mass ascending adjacent the tubular member away from the column of circulating mass descending in said passageway, the upper edges of the louvres of each set being in substantial vertical alignment and said louvres providing the tubular-like member with a plurality of openings the upper and lower edges of which are respectively defined by the lower and upper edges of said louvres.

3. The improvement in vacuum pans of the type having a calandria provided with a downtake and a plurality of tubes, said improvement consisting of a tubular-like member positioned above the downtake in substantially vertical alinement therewith for promoting the circulation of the mass being concentrated in the pan, said tubular-like member providing a vertically extending passageway for the circulating mass descending toward the downtake and comprising a plurality of sets of vertically spaced arcuate louvres, and upright radially disposed plate-like supporting members for the louvres respectively interposed between and arranged in abutting relation with the adjoining ends of adjacent sets of louvres, each of said louvres having an outer surface inclined upwardly and outwardly to deflect the circulating mass ascending adjacent the tubular member away from the column of circulating mass descending in said passageway.

4. The improvement in vacuum pans of the type having a calandria provided with a downtake and a plurality of tubes, said improvement consisting of a tubular-like member positioned above the downtake in substantially vertical alinement therewith for promoting the circulation of the mass being concentrated in the pan, said tubular-like member providing a vertically extending passageway for the circulating mass descending toward the downtake and comprising a plurality of sets of superimposed arcuate louvres, the lower edge of each louvre except the lowermost one of each set being spaced vertically above the upper edge of the next subjacent louvre to provide the tubular-like member with a plurality of openings, each of said louvres being inclined upwardly and outwardly to deflect the circulating mass ascending adjacent the tubular member away from the column of circulating mass descending in said passageway and the upper edges of the louvres of each set being in substantial vertical alignment.

5. The improvement in vacuum pans of the type having a calandria provided with a downtake and a plurality of tubes, said improvement consisting of a tubular-like member positioned above the downtake in substantially vertical alinement therewith for promoting the circulation of the mass being concentrated in the pan, said tubular-like member providing a vertically extending passageway for the circulating mass descending toward the downtake and comprising a plurality of sets of vertically spaced arcuate louvres, upright supporting members for the louvres respectively interposed between and arranged in abutting relation with the adjoining ends of adjacent sets of louvres, the louvres of one set being arranged in staggered relation with the louvres of another set and each of said louvres having an outer surface inclined upwardly and outwardly to deflect the circulating mass ascending adjacent the tubular member away from the column of circulating mass descending in said passageway.

JAMES HAMILL.